United States Patent [19]
Crews

[11] Patent Number: 5,149,489
[45] Date of Patent: Sep. 22, 1992

[54] ILLUMINATED SKI BOOTS AND POLES

[76] Inventor: Robin Crews, R.D. 3, Box 154, Little Falls, N.Y. 13365

[21] Appl. No.: 831,675

[22] Filed: Feb. 5, 1992

[51] Int. Cl.⁵ .............................................. F21V 5/00
[52] U.S. Cl. ..................................... 362/32; 362/102; 362/103; 36/137; 280/811; 280/819
[58] Field of Search ....................... 362/32, 102, 103; 280/809, 811, 819; 36/117, 137

[56] References Cited

U.S. PATENT DOCUMENTS

| | | | |
|---|---|---|---|
| 2,941,315 | 6/1960 | Irving et al. | 36/137 |
| 4,206,445 | 6/1980 | Steinhauer | 280/819 |
| 4,279,433 | 7/1981 | Petaja | 280/819 |
| 5,056,821 | 10/1991 | Fierro | 362/102 |

FOREIGN PATENT DOCUMENTS 0371913  6/1990  United Kingdom ................ 280/819

Primary Examiner—Ira S. Lazarus
Assistant Examiner—Sue Hagarman
Attorney, Agent, or Firm—H. Jay Spiegel

[57] ABSTRACT

Skiing equipment is disclosed including improvements in ski boots and ski poles. The inventive ski boots include two layers of material for added warmth as well as a plurality of illuminated regions. Each illuminated region includes a lens which is elongated and which may be colored. Within each lens, an optical fiber is disposed. All of the optical fibers are exposed to light from a light source contained in each boot so that all of the lenses are illuminated when a switch is activated. The inventive ski poles have a transparent housing with a handle containing batteries and a light and with an optical fiber extending through the transparent portion to be illuminated by the light within the handle.

16 Claims, 2 Drawing Sheets

5,149,489

ILLUMINATED SKI BOOTS AND POLES

BACKGROUND OF THE INVENTION

The present invention relates to illuminated ski boots and poles. In the prior art, illuminated canes and footwear are known, however, Applicant is unaware of any such devices having all of the features and aspects of the present invention.

The following prior art is known to Applicant:

U.S. Pat. No. 4,236,544 to Osaka discloses a safety-enhancing walking stick having a light source designed to periodically flash to enhance safety. The present invention differs from the teachings of Osaka as contemplating a ski pole having a transparent body to which light is transported via an optical fiber.

U.S. Pat. No. 4,625,742 to Phillips discloses a multi-function lighted walking cane. The functions of which include illumination via an elongated fluorescent tube 38 shining light through elongated axially oriented windows 48 within the cane body 12. The present invention differs from the teachings of Phillips as contemplating a ski pole having an elongated transparent housing in which an optical fiber is disposed, which optical fiber is fed light via illumination means disposed within the handle of the ski pole.

U.S. Pat. No. 4,848,009 to Rodgers discloses flashing footwear in the nature of tennis shoes having electrical circuitry including a plurality of light emitting diodes and a mercury switch designed to cause activation of the light emitting diodes responsive to movements of the shoe. The present invention differs from the teachings of Rodgers as contemplating ski boots having a plurality of lighted regions which are illuminated through the use of optical fibers.

U.S. Pat. No. 5,033,212 to Evanyk discloses a system for increasing the visibility of an object consisting of a plurality of light emitting diodes which are powered by a built-in battery. The present invention differs from the teachings of Evanyk as contemplating ski boots having lighted regions which are illuminated through the use of optical fibers.

SUMMARY OF THE INVENTION

The present invention relates to illuminated ski boots and poles. The present invention includes the following interrelated objects, aspects and features:

(a) Firstly, the present invention is considered to be an ensemble of ski equipment including improvements in ski boots and improvements in ski poles.

(b) The inventive ski boots are improved over the prior art as contemplating a multi-layered shoe construction having a plurality of regions having colored or transparent elongated lenses mounted therein. Each lens contains an optical fiber which is contained between the layers of the boot and leads from a source of light to each respective lens. If desired, some optical fibers may be strung through more than one lens to convey light to more than one region on the boot.

(c) Each boot has a suitable power source such as a battery pack as well as illumination means consisting of a light bulb optically coupled to a bundle of optical fibers via a lens structure. Activation of a switch located on each boot causes illumination of the light bulb to thereby convey light to each optical fiber via the common lens therefor. In this way, light from the light bulb is conveyed to each region of the boot containing a lens so that the boot may be suitably illuminated. If desired, an R-C circuit may be incorporated into the electrical circuitry of each boot to allow the lighted regions to flash.

(d) The inventive ski poles include a handle having a battery chamber as well as containing a light bulb in a suitable lens.

(e) The handle is attached to an elongated transparent tubular portion made of a material such as strong plastic. An example of such a material comprises LUCITE or LEXAN. An elongated optical fiber is extended from the above described lens downwardly through the elongated tubular housing so that when a switch on the handle is closed, light from the light bulb focused by the lens will illuminate the optical fiber. Again, as in the case of the ski boot, the inventive circuitry of the ski pole may include an R-C circuit to allow flashing of the light emanating from the optical fiber. As should be understood by those skilled in the art, the elongated tubular housing is attached at its lower end to the appropriate spike and circular plate.

As such, it is a first object of the present invention to provide illuminated ski boots and poles.

It is a further object of the present invention to provide such an ensemble including the use of optical fibers and light bulbs emanating light which is focused by an appropriate lens.

It is a still further object of the present invention to provide such an ensemble of devices wherein the light bulbs thereof are battery powered.

It is a still further object of the present invention to provide such a device including means for flashing the light emanating from the respective optical fibers.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
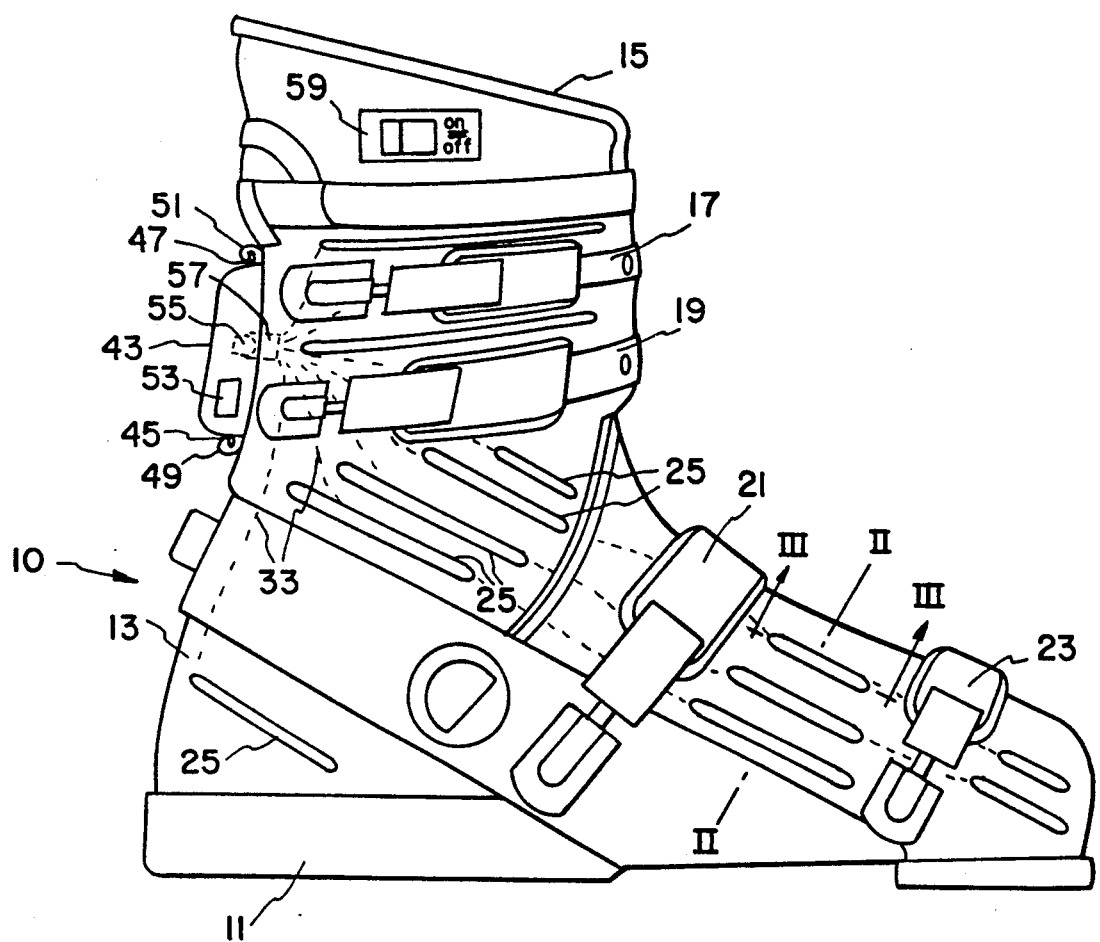
FIG. 1 shows a side view of a ski boot made in accordance with the teachings of the present invention.

With reference, first, to FIGS. 1, 2, 3 and 4, a ski boot made in accordance with the teachings of the present invention is generally designated by the reference numeral 10 and is seen to include a sole 11, a body portion 13 and an opening 15 designed to receive the foot of the user. Conventional buckle-strap combinations 17, 19, 21 and 23 are provided as is known.

With reference to FIG. 1, it is seen that a plurality of regions on the body 13 of the boot 10 have elongated lenses 25. Some of these lenses may be transparent while others may be made in any one of a plurality of different colors. However, each lens is intended to be light transmissive.

Figure 2:
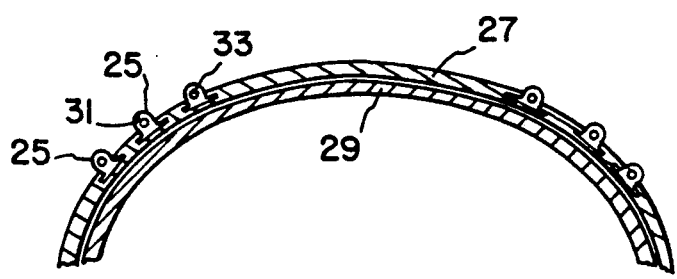
FIG. 2 shows a cross-sectional view along the line 2—2 of FIG. 1.

As seen with reference to FIG. 2, the body 13 of the shoe 10 is made in two layers including an outer layer 27 and an inner layer 29. These layers are preferably made of a lightweight thermally insulative material. As particularly shown in FIG. 2, each lens 25 defines an internal chamber 31 which contains an optical fiber 33.

Figure 3:
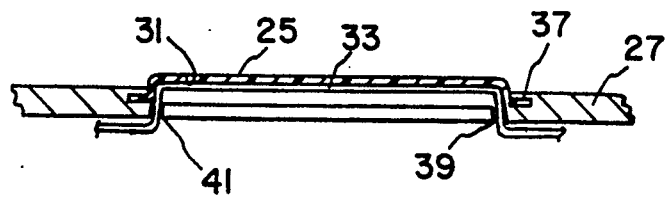
FIG. 3 shows a cross-sectional view along the line III—III of FIG. 1.

With reference to FIG. 3, the lens 25, chamber 31 and optical fiber 33 are shown in greater detail. As should be understood from FIG. 3, each lens 25 has a peripheral outwardly extending lip 37 which is suitably embedded within the outer layer 27 of the body 13 of the boot 10. As shown in FIG. 3, adjacent each lens 25, openings 39, 41 are formed within the layer 27 to allow the optical fiber 33 to be suitably disposed as shown in FIG. 3 extending through the chamber 31 of the lens 25. As also shown in FIGS. 2 and 3, the optical fibers are conveyed between the layers 27, 29. This is particularly shown with reference to FIG. 2.

With reference back to FIG. 1, a housing 43 is seen mounted on a back surface of the body 13 of the boot 10. The housing 43 has outwardly extending detents 45, 47 which are suitably engaged by clamps 49, 51 to hold the housing 43 in mounted position. A battery access door 53 is provided on the side of the housing 43 to allow access to one or more batteries 54 (not shown in FIG. 1) which power the light bulb 55 shown in phantom in FIG. 1 which is optically coupled to the lens 57 which is also optically coupled to the optical fibers 33 shown in phantom in FIG. 1. As shown, each optical fiber may supply light to more than one lens 25. An on-off switch 59 is provided on the boot 10 to allow activation and deactivation of the illumination system.

Figure 4:
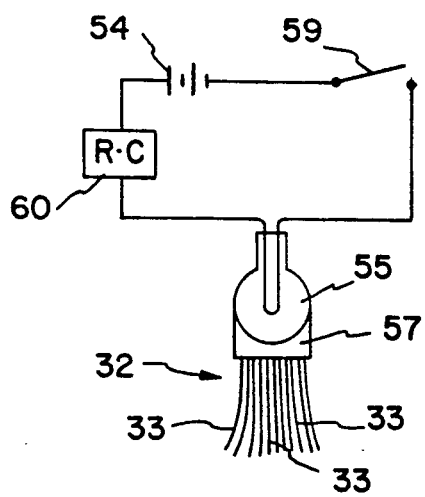
FIG. 4 shows a schematic representation of the electrical circuitry of the present invention.

With reference to FIG. 4, a schematic representation of the preferred electrical circuitry is seen to include the battery or batteries 54, the switch 59, the light bulb 55, the lens 57 and an optical fiber bundle 32 containing a multiplicity of optical fibers 33. Additionally, an R-C circuit 60 may be provided in the electrical circuitry to allow flashing of the light bulb 55 and thereby light emanating from the optical fibers 33 with any desired frequency.

In the operation of the illuminated ski boot 10, the lens 57 is exposed through an opening (not shown) rearwardly facing in the body 13 of the boot 10. When the housing 43 is suitably clamped on the rear of the ski boot 10 by virtue of clamping means 49, 51, the light bulb 55 is exposed through an opening (not shown) in the housing 43, which opening is aligned with the lens opening, above described. While the on-off switch 59 is shown mounted on the ski boot, if desired, this switch 59 may suitably be mounted on the housing 43. In the position shown, a plug (not shown) may be provided on the housing 43 which plugs into a receptacle (not shown) in the ski boot when the housing 43 is attached as shown in FIG. 1 so that electrical conductors may interconnect the switch 59 in the position shown in FIG. 1 into the electrical circuitry of the present invention.

In any case, wherever the switch 59 is located, when the switch 59 is closed, light from the light bulb 55 is focused by the lens 57 and conveyed to the optical fibers 33 which convey the light to the multiplicity of lenses 25 of differing colors so that the ski boot 10 has a multiplicity of illuminated regions thereon.

Figure 6:
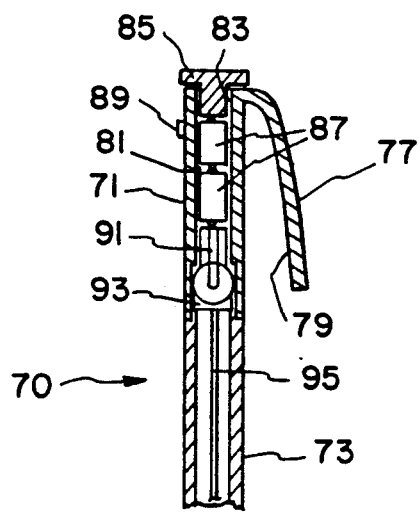
FIG. 6 shows a sectional cut through a portion of the ski pole illustrated in FIG. 5.
Figure 5:
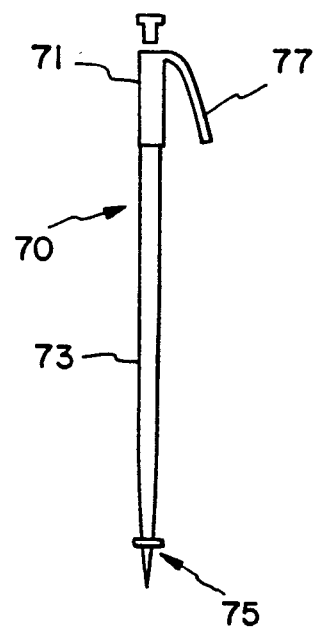
FIG. 5 shows a side view of a ski pole made in accordance with the teachings of the present invention.
Figure 7:
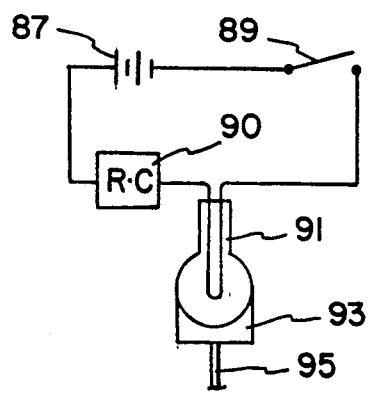
FIG. 7 shows a schematic representation of the electrical circuitry of the ski pole.

With reference to FIGS. 5-7, a ski pole made in accordance with the teachings of the present invention is designated by the reference numeral 70 and is seen to include a handle 71, an elongated body 73 and a combination spike/plate 75. The handle 71 has a downwardly depending portion 77 creating a recess 79 in which the user's hand may be inserted to allow gripping the handle 71.

The handle 71 has an internal chamber 81 having an upper opening 83 suitably removably closeable by a plug 85 which may be threaded with threads of a pitch complimentary to corresponding threads within the chamber 81.

Batteries 87 are contained with the chamber 81 and supply electrical power via a switch 89 to a light bulb 91 which is aligned with a lens 93 designed to focus light emanating from the light bulb 91 and to convey such light into the optical fiber 95 extending downwardly through the elongated body 73.

In the preferred embodiment of the present invention, the elongated body 73 is transparent and is made of a strong structural plastic such as, for example, LUCITE or LEXAN. Any material is suitable for use in making the elongated body 73 so long as it resists breakage and shattering, is transparent and is sufficiently lightweight enough to be suitable for use as the elongated body of a ski pole.

FIG. 7 shows a schematic representation of the electrical circuitry of the inventive ski pole including the batteries 87, the switch 89, the light bulb 91, the lens 93 and the optical fiber 95. The optical fiber 95 may be suitably secured at its end distal from the lens 93 in any desired manner. Furthermore, the electrical circuitry illustrated in FIG. 7 may include an R-C circuit 90 designed to allow the light bulb 91 to flash at any desired frequency.

In the operation of the inventive ski pole 70, with batteries 87 within the chamber 81 as shown in FIG. 6, the switch 89 may be closed to cause illumination of the light bulb 91. Light emanating from the light bulb 91 will be focused by the lens 93 and will be conveyed down the optical fiber 95 to thereby illuminate the elongated portion 73 of the ski pole 70. If desired, the elongated body 73 may be made in a transparent colored material rather than merely being transparent.

As should be understood by those skilled in the art based upon the above description, the intent of the present invention is that a skier will use ski boots such as the ski boots 10 as well as ski poles such as the ski poles 70 in an ensemble. With such ensemble in use, not only is a decorative result obtained but an additional safety factor is provided should the skier fall into a remote area of the snow or should the skier be skiing at night. In any case, the lightweight simple nature of the inventive circuitry is designed to provide the least disruption to the skier's activities. The double layered nature of the ski boot body 13 is provided to enhance warmth and, as best seen in FIG. 1, the body 13 of the ski boot 10 extends upwardly a distance greater than the usual ski boot to provide additional warmth and insulative properties.

As such, an invention has been disclosed in terms of a preferred embodiment thereof, which fulfills each and every one of the objects of the invention as set forth hereinabove and provides a new and useful ensemble of illuminated ski boots and poles of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

We claim:

1. A ski equipment ensemble, comprising:
   a) a pair of ski boots, each boot comprising:
      i) a body portion and a sole;
      ii) said body portion having a plurality of lenses mounted thereon, each lens defining an internal chamber;
      iii) an optical fiber within each chamber and optically coupled to a light source mounted on said boot;
   b) a pair of ski poles, each pole comprising:
      i) an elongated transparent body;
      ii) a spike connected at one end of said body;
      iii) a handle connected at another end of said body, said handle containing a further light source optically connected to a further optical fiber extending within said body.

2. The invention of claim 1, wherein said boot body portion has two layers of material, said boot optical fibers being located between said layers.

3. The invention of claim 1, wherein said plurality of lenses comprises a multiplicity of lenses, at least one of said lenses having a colored surface.

4. The invention of claim 3, wherein said boot optical fiber within each chamber comprises at least a single optical fiber supplying light to more than one chamber.

5. The invention of claim 1, wherein said elongated transparent body is made of plastic.

6. The invention of claim 1, wherein said further light source comprises at least one battery supplying power to a light bulb.

7. The invention of claim 5, wherein said elongated transparent body is tubular.

8. An illuminated ski boot, comprising:
   a) a body portion and a sole;
   b) said body portion having a plurality of lenses mounted thereon, each lens defining an internal chamber; and
   c) an optical fiber within each chamber and optically coupled to a light source mount on said boot.

9. The invention of claim 8, wherein said body portion has two layers of material.

10. The invention of claim 9, wherein said boot optical fibers are located between said layers.

11. The invention of claim 8, wherein said light source comprises a housing removably attached to said boot, said housing containing at least one battery electrically connected to a light bulb.

12. The invention of claim 8, wherein said optical fiber comprises a single fiber supplying light to more than one chamber.

13. An illuminated ski pole, comprising:
   a) an elongated transparent body disposed between a handle and a spike;
   b) said handle containing a source of light; and
   c) an optical fiber optically coupled to said source of light and extending through a chamber in said body.

14. The invention of claim 13, wherein said body is tubular.

15. The invention of claim 13, wherein said body is made of plastic.

16. The invention of claim 13, wherein said source of light comprises at least one battery electrically connected to a light bulb.

* * * * *